United States Patent [19]

Blair

[11] Patent Number: 4,659,319
[45] Date of Patent: Apr. 21, 1987

[54] IMAGE IN THREE DIMENSIONS WITH PICTURE COVERING AND FORMING SYSTEM

[76] Inventor: June L. Blair, 2582 Redick Ave., Omaha, Nebr. 68112

[21] Appl. No.: 720,527

[22] Filed: Apr. 8, 1985

Related U.S. Application Data

[63] Continuation-in-part of Ser. No. 620,696, Jun. 14, 1984.

[51] Int. Cl.$^4$ .......................... A63H 3/36; A63H 9/00
[52] U.S. Cl. ..................................... 446/87; 446/391;
  156/58; 156/59; 156/61; 156/63; 428/16
[58] Field of Search .......................... 446/391, 87, 385;
  40/160; 428/16; 156/58, 59, 215, 61, 63, 300

[56] References Cited

U.S. PATENT DOCUMENTS

| | | | |
|---|---|---|---|
| 2,309,447 | 1/1943 | Greneker | 446/391 X |
| 2,468,731 | 5/1949 | Borkland | 156/59 |
| 4,203,789 | 5/1980 | Delorme | 156/59 |
| 4,294,634 | 10/1981 | Mookil | 446/391 X |

FOREIGN PATENT DOCUMENTS

| | | | |
|---|---|---|---|
| 22825 | of 1908 | United Kingdom | 446/385 |
| 6670 | of 1909 | United Kingdom | 446/385 |

Primary Examiner—Rober A. Hafer
Assistant Examiner—Terrence L. B. Brown
Attorney, Agent, or Firm—James D. Welch

[57] ABSTRACT

A three-dimensional image, which can be the face of a person, or other image having: a base, a picture module formed of flexible picture material bearing thereon a picture-making coating which latter is imprinted thereon in duplication from a photograph by known methods, the picture-module being attached to the forward side of the base and such forward side having a shape complementary to the picture coating as is accomplished by the method of this invention which is sculpting the material which makes the forward side of the base while such material is flexible and before heating it, the shaping of the moldable material being done by pressure exerted on and through the module as guided visually by the picture-making coating which latter can be accomplished by human sculpturing skill whereby the picture module is also sculpted into a new shape and complementary to the sculpted base. An alternative to the use of moldable and bakable material being to form the shape of the face by use of stitching to gather into protruding portions a stitchable flexible material, such stitching being done through such a module with its picture-coating as the guide. The image can be the face of a being having a voice and a voice-recording player assembly can be mounted on the face image which contain the voice of the same being. The face image can be made from three photographs taken from the front, right and left sides and lapped to register with one another at the corners of the respective eyes whereby not only the front but the sides of the picture module become sculpted.

6 Claims, 8 Drawing Figures

IMAGE IN THREE DIMENSIONS WITH PICTURE COVERING AND FORMING SYSTEM

This application is a continuation-in-part of the applicant's co-pending patent application Ser. No. 620,696, filed June 14, 1984 and titled: THREE-DIMENSIONAL IMAGE WITH PICTURE COVERING AND FORMING SYSTEM.

BACKGROUND OF THE INVENTION

Extremely life-like images have always been of great interest in the prior art. Wax museums startle viewers with the sense of being present in history in the very room with a famous person.

Wax museum figures have the disadvantage that they are subject to melting at high temperatures.

A method of making mannequins for store windows was proposed in U.S. Pat. No. 2,309,447, issued Jan. 26, 1943 to L. L. Greneker, and titled: DISPLAY DEVICE AND METHOD OF MAKING THE SAME.

The Greneker method involved completely shaping a head by sculpturing methods prior to the addition thereto of a flexible material such as paper or fabric coated with photographic impressions. Such coated fabric is then applied in one or more sections and the fabric is cut so as to fit around prominent parts of a face such as the nose and mouth.

The cutting of the fabric provided a recess or gore separating the photographically coated fabric into two parts, one half on one side of a recess and the other half on the other side of a recess.

The fabric at the two sides of the recess were then fitted and adhesively secured to the surface of the model so that parts of the coated fabric could become in substantial registry with the corresponding contours of the model to the extent possible by such a method of cutting and fitting.

The two edges of a recess in the fabric piece were brought into abutment along a vertical line extending from the tip of the nose to the neck in order to form nose, mouth and chin.

Other parts of the face were fitted in a similar manner by such cuttings of recesses in the fabric with the objective of bringing all edges into abutment.

A disadvantage of the Greneker method can be seen in the great skill required to make the cuts at the right places. Gaps at the joints were to be subdued by filling with pigment.

Another disadvantage is that the pigment is not itself a part of the photographically imprinted fabric.

However the objective was to make a mannequin which is quite a different objective than to make an image so life-like in its exact representation of an actual human being as to be startling in the substantially complete similarity, as seen in front view.

Such substantially complete similarity, which is the objective of this invention, is similar to the immediate recognizability of a excellent photograph, but of course, even more recognizability is achieved because of the 3-dimensional effect, as seen in front view.

Wax museum images can be made by a sculptor while looking at a photograph to guide forming the 3-dimensional sculpture. Greneker's method can be used by making the 3-dimensional sculpture while the sculptor is looking at a photograph while the photograph is not attached to the 3-dimensional sculpture.

But in the system hereof the photograph is not separated from the sculpture during the formation of the sculpture.

In the present invention the new system involves forming the 3-dimensional sculpture of the face-portion of the finished product while the photographically coated flexible face module is not separate from the sculpture but is instead in contact with the sculpture, purposely placed on the sculpture while the sculpture is soft and moldable.

The new discovery hereof is that it is possible to press on the photographically coated face module and actually form the 3-dimensional face sculpture by use of such pressing-through the photographically printed face module as the only or main method of sculpting the face.

In other words, before the stage of pressing-through the flexible face module no previous face-sculpturing at all is necessary with the method hereof.

A particular object is to provide a way to form a human face sculpture with front view accuracy as the sculptor is guided by the picture on the face module.

As compared with sculpturing while merely looking at an unattached photograph, the method hereof provides a new art form, making possible great front view accuracy with much greater sculpting speed.

Another objective is to provide a new article of manufacture, a finished product which is a face-sculpture having mounted thereon a photographically picture-coated piece of material, the coated material not being cut in its interior parts for fitting over protruding facial features of the sculpture therebeneath, but being substantially of one-piece of substantially uncut material.

A very great seeming realism is achieved herein by providing the face image with a recording assembly mounted therein and delivering a reproduction of the voice of the very same being the face image portrays. In the prior art, voice recordings of living beings have not been used with images of those beings to my knowledge.

BRIEF DESCRIPTION OF THE DRAWINGS

FIG. I is a side elevation of a soft head image formed by one of these methods hereof, portions being broken away to show the interior.

DESCRIPTION OF THE PREFERRED EMBODIMENTS

Figure 1:
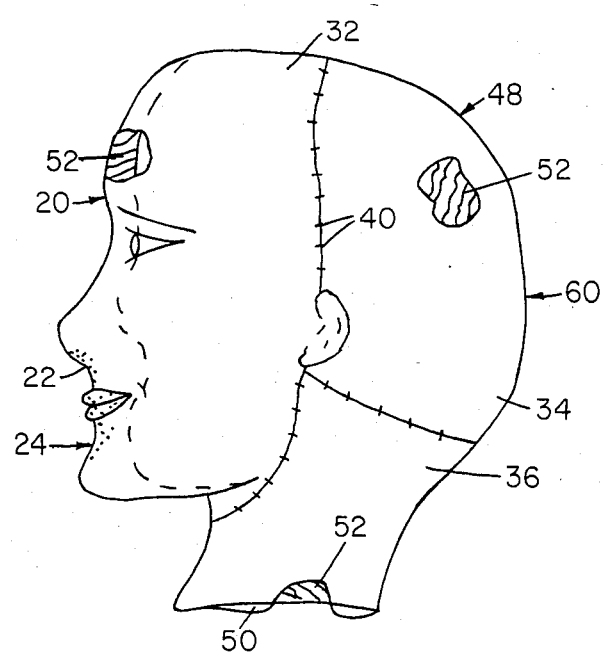
Figure 2:
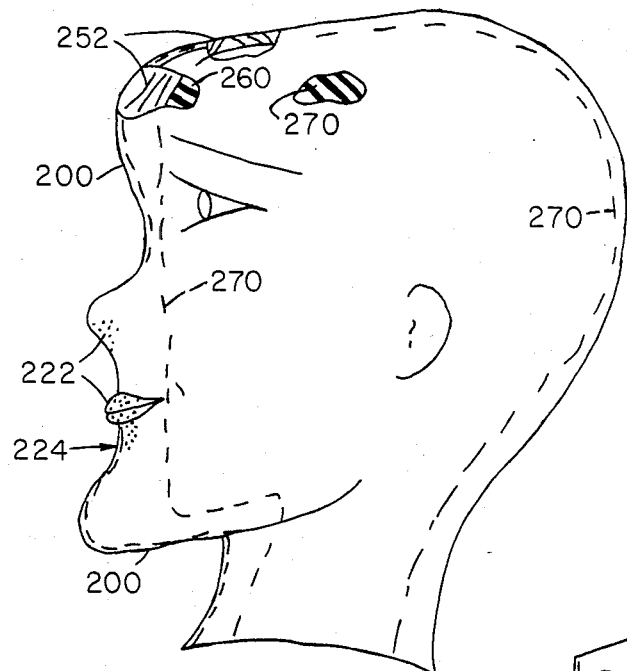
FIG. 2 is a side elevation of a hard head image formed by a second method hereof, with parts broken away.
Figure 3:
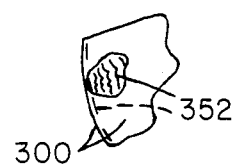
FIG. 3 is a portion of a head image formed by a sewing method called soft-sculpt method, the portion being a side elevation with a portion broken away.

The steps of the process of this invention are hereinafter described by illustrating the process as it is used to make the face of a soft-faced doll although the process can be used to make other images also.

The steps are as follows: (1) First a photograph, not shown, is provided as the starting point. (2) Second comes the printing of a photographic two-dimensional image on a picture-making or picture-front module 20 onto any flexible material which will receive a printed likeness. The printing is in dots 22 forming a coating or imprinting 24, preferably printed, in a prior art manner, on the picture making module so as to make areas of darkness and lightness to represent the face of the person who has been photographed. The module 20 can be of cloth or a vinyl, or paper for example.

Step (3) is to provide a plurality of secondary flexible sack-making components 32, 34, and 36. The picture front module 32 defines a forward sack-making component, and includes the picture-front module 20 at the forward portion thereof.

As a step (4) the sack-making components 32, 34, and 36 are secured together such as by stitches 40 so as to form a unitary head-sack 48 which is hollow and having an opening 50 therethrough at the bottom of a neck of the head-sack 48.

Step (5) is to insert soft molding material, such as clay or commercial compounds, shown at 52, behind the picture-front module 20 by use of the hole 50.

The outer or forward side of the module 20 bears the imprinting 24.

The molding material 52 itself can be called also a support 52 for the picture-making module 20.

Step (6) is, by keeping one hand behind the molding material by inserting it through the opening 50, to (Step 7) press against and form the molding material 52 using the picture making module 20 as a guide, thereby defining a seventh step. Step (8) is to heat-harden the material 52.

The molding material 52 will later form a face-supporting part of a base 60.

The base 60 will comprise the head-sack 48 and the molding material 52 and such filling material as will later be put in the head-sack 48.

The molding material 52 is three dimensionally formed to correspond with the photo-face photographically imprinted by the coating 24.

The molding material 52 is thus in complete contact with the picture-making module and is caused to be shaped so as to be substantially complimentary in three dimensions to the face-picture shown in two dimensions on the picture-front module 20. This is possible because the picture-front module 20 is not stiff but flexible.

Experiment has revealed the discovery that it is practical and possible for a skilled sculpturer to shape the molding material 52 with the fingers by pressing on the flexible picture-front module 20 in different skillful ways as guided by the face picture on the picture-front module.

If the face picture was not photographic printed, but was a two-dimensional portrait on flexible material, well-done to indicate height and depth of facial features, then such a portrait-picture front-module could be used in the process in place of a photographically printed module, and such a portrait picture will work in either the soft-head process or the hard-head process described herein.

Step (8) is done by removing the material 52 to bake it and Step (9) is to glue the material 52 back onto the inside of the module 20, unless the module 20 and the head-sack 48 are formed of a material that will stand baking, such as polyester in which case they can be baked together.

When a hard-head is desired, the steps (H-1) and (H-2) are the same as steps (1) and (2) used in making the head of a soft-head doll.

Step (H-3) is then to place moldable material 252 against the back of the picture making module 200 and to press it against the module with one hand while pressing against the outer side of the module 200 with the other hand, using the picture module 200 imprinting 224 as a guide to form the three dimensional face-shape.

Step (H-4) is to peel the module 200 off of the moldable material.

Step (H-5) is to provide a styrofoam head-form 270.

Step (H-6) is to place the molded moldable material 252 on the head-form and mold the portion of it beyond that molded around the head-form.

The moldable material 52 or 252 can be clay or modeling compound, an example being Poly-Form made by Poly-Form Products Inc. 9420 Byron St., Schiller Park, Ill. 60176.

Step (H-7) is to place the head-form 270 covered with molded moldable material in contact with picture-making module 200.

Another method is called a soft-sculpt method. The basic thing on this type is to have a soft-faced doll such as is in the prior art in which behind the outer structure is soft material. In the prior art the shape of faces of the soft-sculpt doll had been very realistic at times on some of the soft-sculpt dolls.

After the photograph is laid over the soft-sculpt base, then stitching is done on the nose to cause it to take the shape of the nose on the photograph. Stuffing is optional. In soft-sculpt, the basic form is first covered with a piece of cloth and then on top of that is placed the photograph bearing material. The stitching is done through the photograph bearing material and through the under cloth that is between the photographic cloth and the soft-sculpt form foundation).

This stitching when done and in the right way and in accordance with the photograph will cause the outer side of the photographic material to take on the shape of the face that is represented in the photograph.

At some places in the face, it will be necessary that there be more material between the photograph material and the foundation and to get material into that position is done by stuffing. The stuffing is done by pushing the under-layer into desired positions using the fingers or any suitable implement, such as tweezers or whatever.

For instance, if a bridge on the nose is desired, extra stitching is done to hold the nose in place. However, the prior art has in it already methods of making a doll face by stitching and stuffing in which an outermost material is used and under material of flexible nature is used and then the foundation is under that. That technique in the prior art is already known as the method of making doll faces. However, what hasn't been known is the business of using as an outermost layer a photographically printed material so that as the stitching is done, the face takes on the form of the photograph.

This stitching goes through the outermost layer, which is photographically printed, and through the under layer, and into the material of the foundation.

If a customer wants to send in a tape recorder of the voice of a child, for example, then the small miniaturized tape player can be disposed inside the doll so that upon pressing a switch the doll will seem to talk with the very voice of the one whose face is on the doll.

Figure 4:
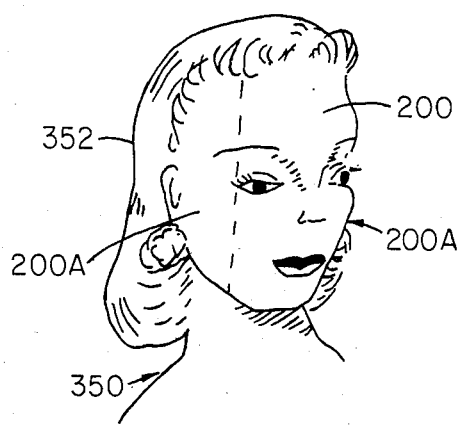
FIG. 4 is a front and right side elevation of a head image formed by one of the methods hereof, portions being broken away to show the interior.
Figure 5:
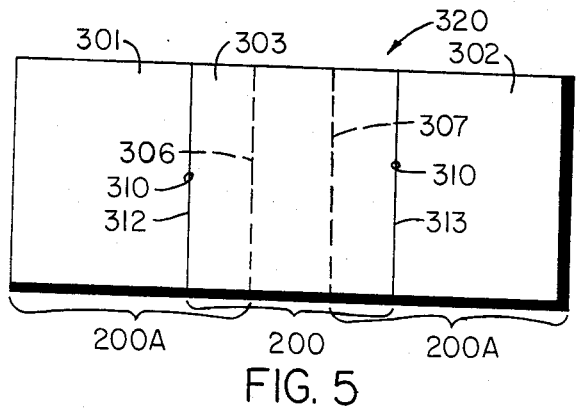
FIG. 5 is a view showing three overlapped photographs of the right, front and left sides of the face of a person.
Figure 6:
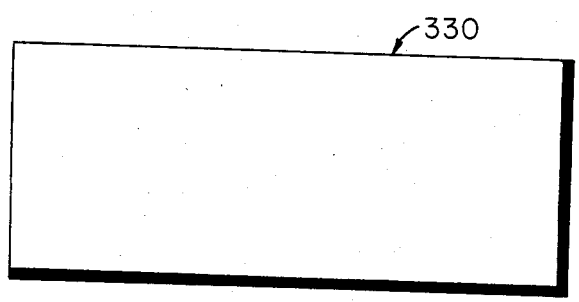
FIG. 6 is a view showing a pre-module made by photographing or printing from the lapped photographs of FIG. 5.

In a modification of the invention shown in FIGS. 4, 5 and 6, second and third photographs 301 and 302 are made of the right and left sides of the same person's face and these will be caused to partially underlap a photograph 303 of the forward side of the person's face, as shown in FIG. 5 in which the underlapping edges are shown in dotted lines at 306 and 307.

The photographs 301 and 302 of the left and right sides of the same person's face are placed in registry at the points 310 where the rear corner of respective right and left eyes are disposed on the respective sides of the left and right side and front side photographs 301, 302 and 303 are located. This leaves the eye-image intact on the front photograph.

The side photographs 301 and 302 are overlapped by the front photograph along edge lines 312 and 313 extending vertically.

The corner of the eye is the best indicator point to use.

This composite front-and-sides view photographic-layer-pile generally indicated at 320 in FIG. 5 is then rephotographed or printed so that the front view and each side view then become on a single flexible pre-module 330 shown in FIG. 6 and which can be either a print or a rephotograph, which latter has a single uniform thickness without any overlaps.

The pre-module 330 is then like one continuous head, split vertically in the back. It can be laid flat.

The pre-module is then photographed or printed onto a moldable flexible material to form a composite picture-module 200 and components 200A of FIG. 4. The material of the picture-module 200 and components 200A can be polyester, vinyl sheet, or vinyl poly clay (called by many trade names, one of which is Polyform), cotton fabric, nylon fabric, etc.

Moldable material 252A is then placed at the rearward side of the composite picture-module 200 and components 200A so that the image or picture-making coating 24A on the composite module 200 and components 200A faces outwardly with its seeming visual depressions and elevations.

Next, sculpting is done by applying sculpting pressure on the forward or outwardly facing side of the composite picture-module 200 and components 200A.

This sculpting is guided by looking at the coating 24A on the module 200 and components 200A.

The sculptor can be either human or robot machine. Studying is mentally, if the sculptor is a human. Studying by other process such as a computer-scan by a scanner that is part of a robot machine is used if the sculptor is a robot machine.

After molding, the molding material 252A, but not the composite picture-module 200 and components 200A, can be optionally hardened by (a) heat, or (b) by air drying, or both (a) and (b), all depending on what type of molding material 252A is used; the heat or air drying being called hardening agents herein.

After molding is done, the molding material 252A: (A) can be left intact and hardened to remain as part of a finished head covered with the module 200 and components 200A, or (B) the molding material 252A can be removed and (1) if picture-module 200 and components 200A rubber or vinyl, they will hold their shape after removal from the molding material if they have been hardened or "set" by a hardening agent, such as air in the case where module 200 and components 200A are made of rubber. (2) If the picture-module 200 and component 200A are fabric, then suitable coating, such as vinyls or polyesters placed on the backside thereof will cause the fabric to hold its shape, even if it is flexible.

When a form-holding type of a vinyl or thermoplastic or metal sheet of moldable material (soft copper being a good material) is used as the composite picture-module 200 and components 200A, then clay or molding material 252A need not be used therebehind. This is because suction from behind or pressure from the front by hand with the human eye, or by machine with a computerized scanner, is sufficient to achieve the 3-dimensional shape of the picture-module 200 and components 200A.

The scope hereof covers not only front-and-side images or dolls, but also front only images, or dolls as regards certain materials newly discovered to be useful as material for picture-module 200 and components 200A, such as soft copper or soft metal plate.

Either human or robot scanner machine molding can be used on either the picture module 200 of front side only, or on the component 200A of front and sides, also.

If more of the eye is taken from the side view by overlapping less of a side photograph by the front photograph then the side view of the eye might be more accurate, but the front view of the eye would be less accurate and this distortion of the front view is not desirable as the front view is the most important viewing direction for most purposes.

The construction of FIG. 4 can be considered to be identical in its construction to that of FIG. 1 except for the addition of hair and also with the exception that the composite picture module 200 and components 200A of FIG. 4 extends about three-fourths of the way around the head.

Parts of the head at the back of the neck need no photographic printed coating since those parts of the head are covered by hair which is latter attached. No photograph need be made from the rear, although one could be made from the rear and added to the right or left end of the three-photograph pile of FIG. 5, if desired.

The dotted line on FIG. 4 shows only the position on that respective side at which the final composite picture module has received the rearwardmost part of its picture coating by reproduction from the forward face photograph 303, so that all but those parts of the picture-module 200 and components 200A which are at the right and left sides and rearward of the rear corner of the respective eyes are made from reproduction from the forward face photograph 303.

FIG. 4 shows a finished head image 350 with hair 352 attached thereto.

Figure 7:
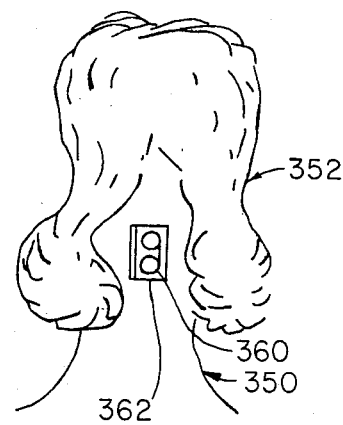
FIG. 7 is a view showing a portion of the rearward side of a head image showing a recording assembly mounted therein and accessible through a door for delivering a recording of the voice of the person of the image.

In FIG. 7 a voice recording player 360 is shown in a recess 362 in the back of the head 350 under hair which has been held aside in FIG. 7.

Figure 8:
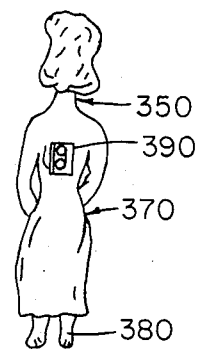
FIG. 8 is a picture of a doll which can have a head like the head images of FIG. 1 or 4.

FIG. 8 shows a doll 370 with the head 350 at its top attached to a torso 380 attached therebeneath, and with a similar voice recording player of tape type or otherwise mounted in the back of the torso thereof as shown at 390 for delivering a reproduction of the voice of the very same person the face of FIGS. 4, 7, and 8 are of.

I claim:

1. A process of making a soft, three-dimensional image of a head of a doll, said process comprising the steps of:
   (1) providing a photograph, said photograph being a two-dimensional image on a primary sack-making component of flexibly hardenable material capable of receiving a printed likeness, said primary sack-making component defining a forward portion of said head of said doll, said forward portion comprising at least some facial features of said head;
   (2) providing a plurality of secondary sack-making components, said secondary components defining a rearward portion of the head of the doll;
   (3) securing together the primary sack-making component with said secondary sack-making components so as to form a unitary head-sack which is hollow and has an opening therethrough at the bottom of a neck portion of said head-sack;
   (4) inserting soft, flexibly hardenable, molding material into the inside of the unitary head-sack behind the primary sack-making component of the unitary head-sack through the opening;
   (5) placing a support means behind the molding material by inserting said support means through the opening, said support means providing support for the unitary head-sack for forming-pressure applied to the outside thereof;
   (6) applying pressure against and forming both the head-sack and the molding material into a three-dimensional image by using the photographic image on the primary component as a guide;
   (7) and hardening the molding material and the unitary head-sack.

2. The process of claim 1 wherein the formed, flexibly hardenable molding material is removed from the unitary head-sack prior to the hardening step.

3. The process of claim 1 further comprising the step of providing photographic images on the secondary sack-making components prior to the step of securing the primary and secondary components together to make the unitary head-sack, so that the secondary components comprise at least some head-like features of said head of said doll.

4. The process of claim 1 wherein the hardening step comprises the addition of heat to effect said hardening.

5. A soft, three-dimensional image of a head of a doll produced by a process of:
   (1) providing a photograph, said photograph being a two-dimensional image on a primary sack-making component of flexibly hardenable material capable of receiving a printed likeness, said primary sack-making component defining a forward portion of said head of said doll, said forward portion comprising at least some facial features of said head;
   (2) providing a plurality of secondary sack-making components, said secondary components defining a rearward portion of the head of the doll;
   (3) securing together the primary sack-making component with said secondary sack-making components so as to form a unitary head-sack which is hollow and has an opening therethrough at the bottom of a neck portion of said head-sack;
   (4) inserting soft, flexibly hardenable, molding material into the inside of the unitary head-sack behind the primary sack-making component of the unitary head-sack through the opening;
   (5) placing a support means behind the molding material by inserting said support means through the opening, said support means providing support for the unitary head-sack for forming-pressure applied to the outside thereof;
   (6) applying pressure against and forming both the head-sack and the molding material into a three-dimensional image by using the photographic image on the primary component as a guide;
   (7) and hardening the molding material and the unitary head-sack.

6. The head of a doll as set forth in claim 5, wherein the plurality of secondary sack-making components comprise photographic images of at least some head-like features of said head of said doll.

* * * * *